Jan. 20, 1948.    J. F. COBB    2,434,758
DRIER CONTROL
Original Filed May 8, 1937    3 Sheets-Sheet 1
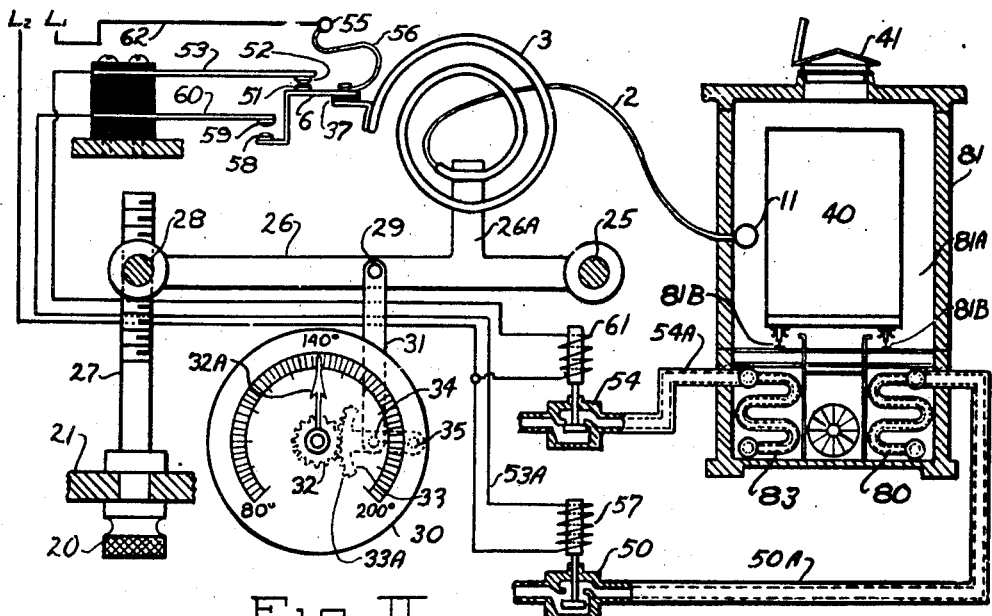
Fig. II
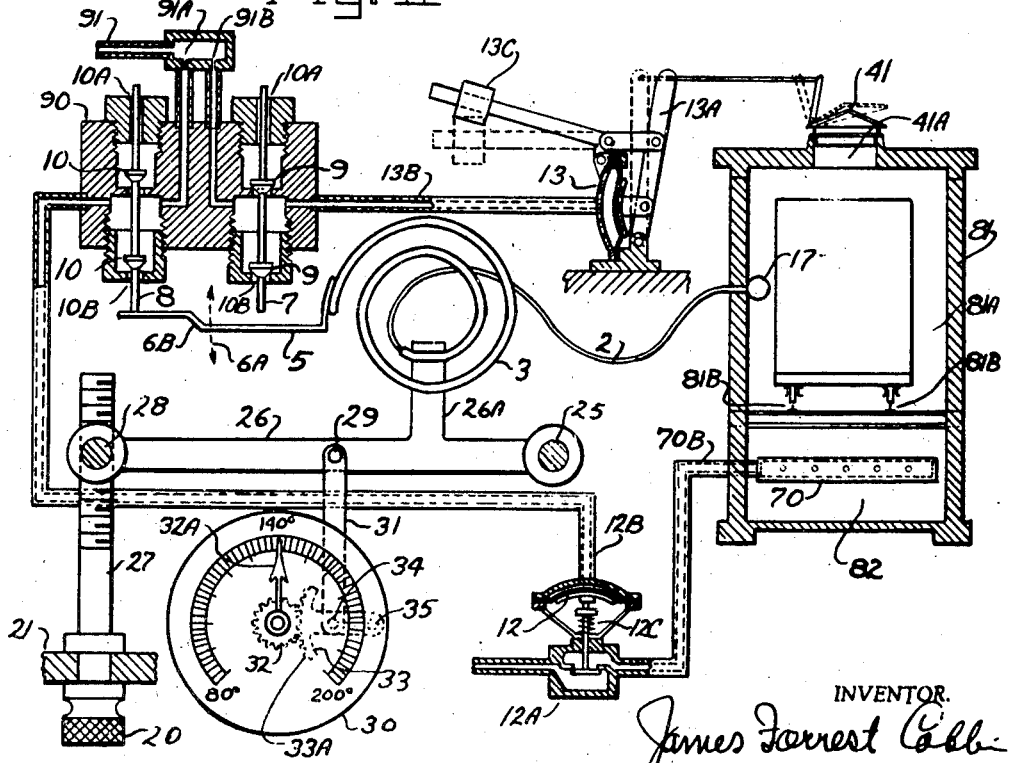
Fig. I
INVENTOR.
James Forrest Cobb Jan. 20, 1948. J. F. COBB 2,434,758
DRIER CONTROL
Original Filed May 8, 1937 3 Sheets-Sheet 2
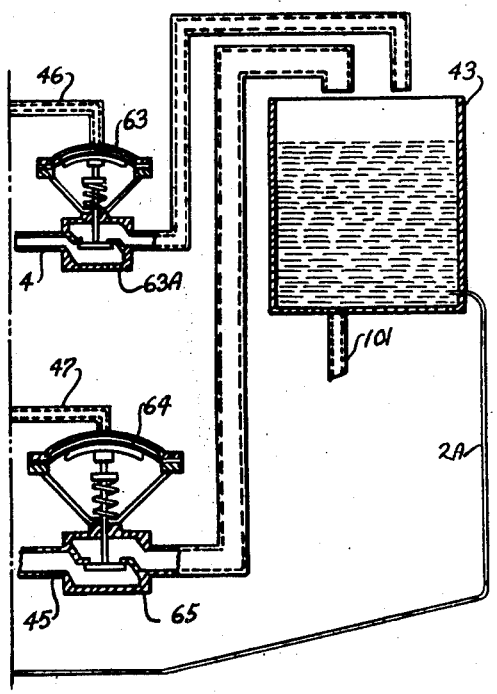
Fig. IV
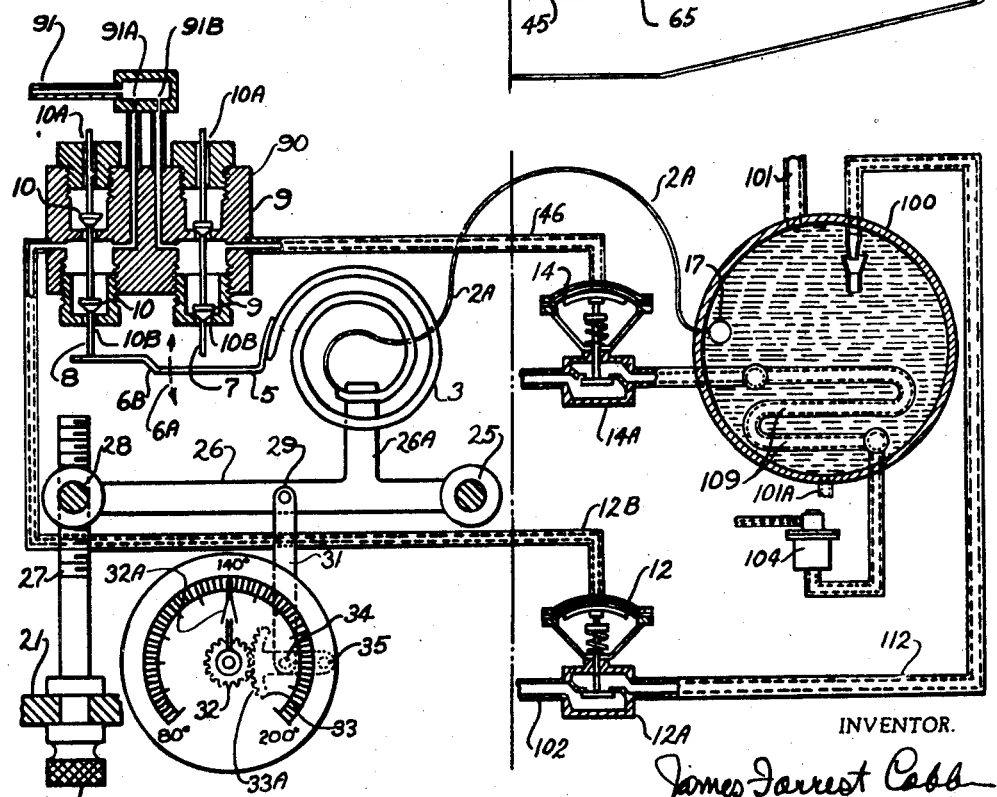
Fig. III
INVENTOR.
James Forrest Cobb

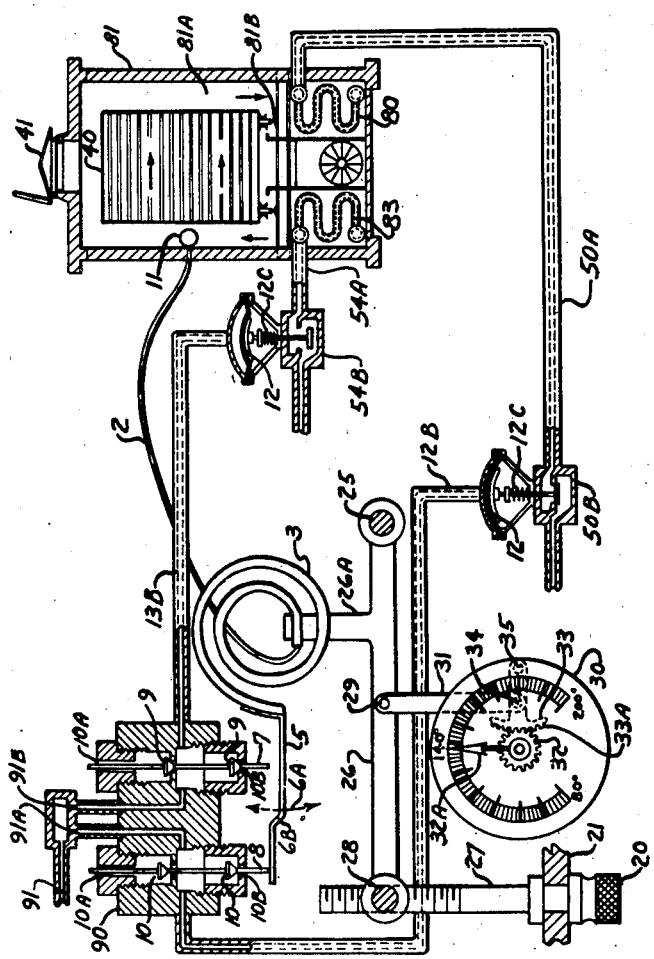

UNITED STATES PATENT OFFICE 2,434,758

DRIER CONTROL

James Forrest Cobb, Portland, Oreg., assignor to The Moore Dry Kiln Company of Oregon, a corporation Original application May 8, 1937, Serial No. 141,504. Divided and this application February 25, 1942, Serial No. 432,220

4 Claims. (Cl. 236—1)

This invention relates to automatic control means generally, to automatic heat and pressure control means more specifically and is especially applicable to automatic heat control means for a drying chamber, in which application it will be specifically illustrated in the following specification for the purpose of explaining the invention.

The present application is a division of my application Serial No. 141,504, filed May 8, 1937, entitled "Drier control," now Patent No. 2,275,042.

An object of my invention is the provision of a device sensitive to conditions, of which a thermostat is a clear example, and so arranging the sensitive device that it will energize means to change the conditions that affect the sensitive device and will then serially energize otherwise independent means that will cumulatively affect the conditions that influence the said sensitive device if required, by steps, particularly where the step influences are cumulative and independent of time.

Another object of my invention is to provide a pressure sensitive working device operatively mounted to energize one mechanism and, if required, serially energize another independent mechanism by spaced steps, in which case the effect of energizing the additional mechanism is cumulative. Pressure is here included as interchangeable with temperature in situations where this is true.

Other objects will be apparent from the specification and are particularly pointed out in the claims.

Drawings accompany and form a part of this specification and are directed to two applications of the invention to dry kiln installations, because the invention is especially valuable for that use though by no means so limited. To indicate other uses, it is shown connected to a hot water tank and a pressure container.

In the drawings,

Fig. I illustrates application of the invention to a dry kiln where motive power to operate atmosphere condition control devices is compressed air, and starting and stopping of the devices is controlled by a thermostat, which in this case will be considered to be a wet bulb thermostat;

Figure II represents a dry kiln in which the atmosphere condition control device is again a thermostat, but will be regarded in this view as a dry-bulb thermostat;

Fig. III diagrammatically represents two means of adding heat to the contents of a cylinder in combination with a two step control of the heat applying means, energized seriatim by different degrees of expansion of a Bourdon tube, according to the general plan disclosed in Figs. I and II;

Fig. IV represents the application of seriatim control of two sources of supply of different capacities when applied to an elevated liquid tank, or other device within which static pressure of a controlled amount is desirable in the face of variable demand; and Fig. V represents the application of my air operated control system to a dry kiln employing two air operated valves.

The thermostats of Figs. I and II are for remote control and both drawings are diagrammatic since devices of this character are compact and difficult to delineate clearly without a number of related views, which are not required with a diagram.

In Fig. I, 81 is a dry kiln structure defining a drying chamber 81A, within which are tracks 81B that support a load of lumber on a truck, both of the latter being indicated by 40. In a subchamber 82 is a humidifier, for example a steam spray pipe 70. Steam of suitable pressure-temperature characteristics will be supplied to the spray pipe 70 by the pipe 70B from a supply source not shown.

A kiln ventilation device, for example a cover 41, is placed at some suitable location on the dry kiln 81 and controls the ventilator duct 41A. Other devices are required for efficient operation of a dry kiln but have been omitted for the reason that they are well known and not directly concerned with this disclosure; the two described are concerned with control of the wet bulb temperature.

The term ventilation referred to in this application refers to air interchange between the inside and outside of the kiln. Thus, ventilator openings may be fresh air intake openings or fresh air outlet openings into or out of the kiln, operated independently or simultaneously.

In some embodiments of my invention where ventilators are placed close to fans for circulating the atmosphere inside the kiln, the ventilators may be placed under the influence of the suction of the fan to take in fresh air from the outside of the kiln or under the influence of the pressure discharge from the fan to exhaust air from the kiln.

Within the drying chamber 81A a wet bulb 17 is suitably located, connected by a capillary tube 2 to a pressure sensitive device such as a spring tube such as the spiral tube 3. Rigid with the spiral tube 3 and movable therewith along a temperature indicating path 6A is a control actuator 5, a contactor 6B having contacts 7 and 8. The inner end of the spiral coil 3 is made rigid with the stud 26A of the arm 26. The arm 26 is pivotally supported at the pivot 25 and movable by any suitable means, for example by the screw 27 working in the nut 28, which is pivotally attached to the arm 26 at the end opposite to the pivot 25.

A link 31 is pivoted to the arm 26 at 29 and to the segment 33 by the pin 34, giving the segment 33 an appropriate arcuate path of movement by virtue of the mounting pivot 35. The segment 33 is provided with gear teeth 33A which mesh with the toothed pinion 32, hence the pointer 32A will indicate the setting of the device, which may be changed by manipulation of the knurled head 20 which is held in place by the mounting, 21. The position of the spring tube 3 can be shifted by manipulation of the knurled head 20, and if properly calibrated with the dial scale 30, definite wet bulb temperature conditions in the chamber 81A will be shown on the scale 30, by the pointer 32A.

The knurled head 20 is manually manipulated until the pointer 32A, which is carefully calibrated to indicate the action of the tube 3, indicates a chosen point on the scale 30, in this case 140 deg. wet bulb temperature.

In Fig. I it will be assumed that before the wet bulb temperature of the drying chamber 81A reached the chosen point of 140 degrees as stated, that the steam spray apparatus 70, was discharging into the kiln by reason of the control valve 12A being open, which was rapidly raising the temperature and humidity, and at that point chosen on the scale, 140 degrees, the control actuator 5 contacted the stem 8 and raised the two discs 10 of the balanced valve from their seats, providing an egress from the pipe 12B, indicated by 10A and 10B, of contained air, under pressure, that was greater in area than the restricted inlet 91A; whereupon the pressure rapidly fell to zero and the spring 12C of the valve 12A asserted itself to close off the steam supply of the steam spray device 70.

Upon a further raise of wet bulb temperature, if it occurs, the arm 5 will move further to contact the stem 7 and raise the valve discs 9 from their seats which will de-energize the air motor 13 in the same manner, whereupon the weight 13C, which is analogous to the spring 12C of the valve 12A, operates to open the ventilator 41 as shown by dotted lines in this figure, which will rapidly check any increase in wet bulb temperature.

Mounted in the air valve body 90 are two control means such as sensitive, preferably balanced, air valves 10 and 9, which respectively control air supply to the tubes 12B and 13B. These valves receive air supply from the tube 91 through the restricted orifices 91A and 91B respectively. When a valve such as 9 is unaffected by the arm 5 it will close by gravity and air pressure will build up in a tube such as 13B and an air motor 13 will move the lever 13A to close the vent cover 41. When the arm 5 under the influence of an increase of temperature in the kiln chamber has registered with an air valve stem such as 8, the corresponding valve 10 will be opened and the motor, in this case the valve air motor 12, will exhaust for the reason that air channels 10A and 10B have a considerably greater area than the air supply orifice 91A. There is a small waste of air while a valve, as 10, is open, which is unimportant.

The motor 13 and the motor lever 13A control the ventilator cover 41 which is shown closed, with its open position indicated by dotted lines.

The valve stems 8 and 7 are arranged to be raised by the arm 5 at temperature spaced intervals, say for example 3 degrees. This is shown by an offset at 6B in the arm 5 but obviously it can be done by numerous equivalent structures.

It is desirable that a single, calibrated pressure sensitive device be employed because it is nearly impossible to make two of them that will draw the same pressure or temperature curve, though quite simple to calibrate an indicating device with a given tube.

When the wet bulb temperature drops below the set point on the dial scale 30, the air valve stem 7, is allowed to seat, which builds up air pressure in the pipe 13B and in the air motor 13, which moves the motor lever 13A to close the vent cover 41. The closing of the vent will ordinarily maintain a desired wet bulb temperature but if the wet bulb temperature in a lumber kiln due to moisture in the wood drops a few degrees more than the set point, the valve stem 8 seats to close the valve 10 on its valve seat to build up pressure in the air line 12B, connecting with the valve motor 12, and to open the valve 12A, turning on the spray 70, which is an auxiliary means for maintaining a sufficient amount of moisture in the kiln.

In Fig. II, the same general principles are applied with electrical energy substituted for compressed air. Energy will be supplied from L1 and L2, which is connected to a source of energy supply not shown. 62 is a bus-bar leading to the terminal 55 and a flexible cable 56 is insulated at 37 from the pressure sensitive device 3. It has two electrical contact members 51 and 58 which serially connect with mating contact members 52 and 59. Bus-bars 53 and 60 are very thin and flexible as is obviously necessary.

Contact of 51 and 52 energizes the solenoid 61, which closes the valve 54 and shuts off the steam supply by way of the conduit 54A to the heating coil 83. Should temperature continue to rise within the chamber of the kiln 81A, a further movement of the pressure sensitive device 3, will cause contacts numbered 58 and 59 to come together, which will energize the solenoid 57 arranged to control the valve 50, which in turn controls the conduit 50A and supplies steam from a source not shown to the heating coil 80.

The valves 50 and 54 are normally opened and will be closed only under the influence of electrical energy means such as the solenoids 61 and 57 when current is supplied through the connecting means 53 and 53A as shown. Otherwise the views in this figure where the numbers are the same as in Fig. I have the same mode of operation as those in Fig. I, except that of necessity electrical operation is more abrupt and will ordinarily require relays which are not here shown because they are well understood. The temperature sensitive device or bulb 11, in this view will be presumed to be a dry bulb thermostat.

Fig. III illustrates an application of my invention for the purpose of controlling heat within a closed vessel such as a cylindrical tank. To the left-hand of the center line in the middle of the drawing the apparatus is in all essentials the same as that shown in Fig. I so far as the temperature control apparatus is concerned; and to the right of the center line is found the cylindrical vessel 100, containing fluid furnished through an inlet conduit 101A and provided with an outlet pipe 101.

Within the receptacle, there are two fluid heating means, the well known mixing valve connected to the conduit 112 and controlled by the valve 12A and the heating coil 109, which is supplied by the steam supply pipe 102A, controlled by the valve 14A, the valves being similar to those shown in Fig. I at 12A. No further explanation is deemed necessary as to their action.

Steam is supplied through 102 and/or 102A and condensate from the coil 109 is drained out by the trap 104. The usual thermostat bulb or pressure generating apparatus 17, is present within the chamber or inclosure 100 and is associated with the pressure sensitive device 3 by means of the conduit 2A.

In Fig. IV, I have shown an elevated tank 43 which represents pressure due to static head or other means as distinguished from temperature. Apparatus of the type shown to the left of the center line in this drawing, Fig. III, will be presumed to be present and associated with the device of Fig. IV, but has not been redrawn, to save repetition.

In this case, however, the conduit 2A which associates the container 43 with the pressure sensitive device 3 is open to the contents of the container without any pressure generating device or bulb, and reliance is had upon static pressure or pressure by any other means to cause appropriate movement of the element 5.

In this figure the conduit 4 and conduit 45 will be connected to a convenient fluid supply source not shown, and the valves 63A and 65, which are essentially the same as the valve 12A of Fig. I, are arranged to control these several means of supplying fluid to the container 43, the step control feature is present and its operation will be a function of demand. The conduit 4, with its appurtenances, will furnish a normal supply to maintain the fluid level substantially as shown, whereas an unusual demand will bring the conduit 45 into operation by pressure change as shown and the combined capacity of the conduits 4 and 45 will then be available to maintain fluid level or pressure within the container 43; and obviously the dial scale 30 may be calibrated in pounds per square inch, or in feet elevation where fluid pressure control is concerned.

I am aware that work has been done in this field. Patent No. 1,705,176 discloses a means of serially energizing separate means for controlling humidity or wet bulb temperature in a dry kiln by providing a delay equipment where, when a thermostat with a single contactor reaches a given point, it will set apparatus in motion to first close a ventilator and afterwards, separate by a variable time interval, it will start a steam spray. I prefer my embodiment, however, because when the ventilator is closed the natural water content of the wood seldom renders it necessary that the steam be turned on, though it is there for emergency use if required.

What I claim as new and desire to have secured to me by Letters Patent, is:

1. In a temperature control apparatus, a mounting therefor, a thermostat comprising a bulb, a pressure sensitive coil and tubing connecting the bulb to the coil, an actuator made rigid with said coil, a pivot attached to said mounting, an arm hinged on said pivot, said coil being mounted on said arm, a plurality of independent control means for operating separate devices, a temperature gauge having a pointer operatively mounted to indicate the temperature to be controlled at said bulb, and being operatively connected to said arm, a threaded adjustment means shouldered on said mounting and operatively connected to said arm for moving said actuator in relation to said control means and said pointer of said gauge, said actuator being spaced farther from one control means than from the other, whereby two different devices under control of said control means may be operated at different temperatures.

2. In a pressure control apparatus, a mounting therefor, a pressure sensitive coil with tubing connecting the coil with a pressure source, an actuator made rigid with said coil, a pivot attached to said mounting, an arm hinged on said pivot, said coil being mounted on said arm, a plurality of independent control means for operating separate devices, a pressure gauge having a pointer operatively mounted to indicate the pressure to be controlled at said source and being operatively connected to said arm, a threaded adjustment means shouldered on said mounting and operatively connected to said arm for moving said actuator in relation to said control means and said pointer of said gauge, said actuator being spaced farther from one control means than from the other, whereby two different devices under the control of said control means may be operated at different pressures.

3. In a temperature control system for a chamber, heating means in said chamber, a control device therefor, another heating means therein, a control device therefor, independent control means for operating said devices, a thermostat comprising a mounting, a bulb sensitive to the temperature of said chamber, a coil connected by tubing to said bulb, an actuator made rigid with said coil, a pivot attached to said mounting, an arm hinged on said pivot, said coil being mounted on said arm, a temperature gauge having a pointer operatively mounted to indicate the temperature to be controlled at said bulb in said chamber, said pointer being operatively connected to said arm, a threaded adjustment means shouldered on said mounting and operatively connected to said arm for moving said actuator in relation to said control means, and said pointer of said gauge, said actuator being spaced farther from one control means than from the other, whereby two different devices under control of said control means may be operated at different temperatures.

4. In a temperature control system for a chamber, low pressure heating means in said chamber, a control device therefor, high pressure heating means therein, a control device therefor, independent control means for operating said devices, a thermostat comprising a mounting, a bulb sensitive to the temperature of said chamber, a coil connected by tubing to said bulb, an actuator made rigid with said coil, a pivot attached to said mounting, an arm hinged on said pivot, said coil being mounted on said arm, a temperature gauge having a pointer operatively mounted to indicate the temperature to be controlled at said bulb in said chamber, said pointer being operatively connected to said arm, a threaded adjustment means shouldered on said mounting and operatively connected to said arm for moving said actuator in relation to said control means, and said pointer of said gauge, said actuator in relation to said control means, and said pointer of said gauge, said actuator being spaced farther from one control means than from the other, whereby two different devices under control of said control means may be operated at different temperatures.

JAMES FORREST COBB.

REFERENCES CITED

The following references are of record in the file of this patent:

UNITED STATES PATENTS

| Number | Name | Date |
|---|---|---|
| 1,630,586 | Smith | May 31, 1927 |
| 1,918,265 | Hartwig | July 18, 1933 |
| 1,920,440 | Stewart | Aug. 1, 1933 |
| 961,734 | Powers | June 14, 1910 |
| 1,731,315 | Mueller | Oct. 15, 1929 |
| 1,607,764 | Lehn | Nov. 23, 1926 |
| 1,875,957 | Thinn et al. | Sept. 6, 1932 |